(12) United States Patent
Shah et al.

(10) Patent No.: US 9,137,001 B2
(45) Date of Patent: Sep. 15, 2015

(54) ENHANCED SCHEDULING OF RESOURCES BASED ON USE OF CARRIER AGGREGATION

(71) Applicant: Sprint Spectrum L.P., Overland Park, KS (US)

(72) Inventors: Maulik K. Shah, Overland Park, KS (US); Jasinder P. Singh, Olathe, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/182,413

(22) Filed: Feb. 18, 2014

(65) Prior Publication Data
US 2015/0236839 A1    Aug. 20, 2015

(51) Int. Cl.
*H04W 72/04*    (2009.01)
*H04L 5/00*    (2006.01)

(52) U.S. Cl.
CPC ........... *H04L 5/0058* (2013.01); *H04W 72/042* (2013.01)

(58) Field of Classification Search
CPC ....... H04L 5/001; H04L 5/003; H04L 5/0027; H04L 5/0053; H04L 5/0058; H04W 72/042; H04W 72/0406; H04W 28/18
See application file for complete search history.

(56) References Cited

U.S. PATENT DOCUMENTS

| | | | |
|---|---|---|---|
| 2011/0177821 A1* | 7/2011 | Senarath et al. | 455/450 |
| 2012/0093105 A1 | 4/2012 | Park et al. | |
| 2013/0201955 A1* | 8/2013 | Vujcic | 370/329 |
| 2014/0254421 A1* | 9/2014 | Ahlander et al. | 370/252 |

FOREIGN PATENT DOCUMENTS

| | | |
|---|---|---|
| EP | 1 968 213 A1 | 9/2008 |
| WO | 2011/098124 A1 | 8/2011 |

OTHER PUBLICATIONS

International Search Report from a corresponding International Application No. PCT/US2015/010973, mailed Apr. 1, 2015.
Written Opinion from a corresponding International Application No. PCT/US2015/010973, mailed Apr. 1, 2015.

* cited by examiner

*Primary Examiner* — Curtis A Alia

(57) ABSTRACT

Disclosed is a method and corresponding apparatus for enhanced scheduling of resources based on use of carrier aggregation. The method involves determining that (i) an individual UE is being served with carrier aggregation or with greater than a threshold amount of frequency and (ii) a processor load of the base station is greater than a threshold load. The method then involves, responsive to the determining that the individual UE is being served with carrier aggregation or with greater than a threshold amount of frequency and that the processor load of the base station is greater than the threshold load, causing the base station to allocate an extent of resources to the individual UE without using FSS.

17 Claims, 8 Drawing Sheets

| CQI index | modulation | coding rate | efficiency |
|---|---|---|---|
| 0 | out of range | | |
| 1 | QPSK | 78/1024 | 0.1523 |
| 2 | QPSK | 120/1024 | 0.2344 |
| 3 | QPSK | 193/1024 | 0.3770 |
| 4 | QPSK | 308/1024 | 0.6016 |
| 5 | QPSK | 449/1024 | 0.8770 |
| 6 | QPSK | 602/1024 | 1.1758 |
| 7 | 16QAM | 378/1024 | 1.4766 |
| 8 | 16QAM | 490/1024 | 1.9141 |
| 9 | 16QAM | 616/1024 | 2.4063 |
| 10 | 64QAM | 466/1024 | 2.7305 |
| 11 | 64QAM | 567/1024 | 3.3223 |
| 12 | 64QAM | 666/1024 | 3.9023 |
| 13 | 64QAM | 772/1024 | 4.5234 |
| 14 | 64QAM | 873/1024 | 5.1152 |
| 15 | 64QAM | 948/1024 | 5.5547 |

Fig. 3

ENHANCED SCHEDULING OF RESOURCES BASED ON USE OF CARRIER AGGREGATION

BACKGROUND

Unless otherwise indicated herein, the materials described in this section are not prior art to the claims and are not admitted to be prior art by inclusion in this section.

In a typical cellular wireless communication system, the air interface between a base station and served user equipment devices (UEs) may define a downlink (or "forward link") for carrying communications from the base station to the UEs and an uplink (or "reverse link") for carrying communications from the UEs to the base station. In various implementations, these links may be defined on one or more carrier frequencies or blocks of frequencies. Furthermore, on each link, various channels may be defined through techniques such as time division multiplexing, code division multiplexing, and/or frequency division multiplexing.

In one implementation, the downlink and uplink may each be divided over time into a continuum of timeslots for carrying communications between the base station and the UEs. UEs may be arranged to transmit data, such as bearer traffic (e.g., user data) and control signaling (e.g., access requests and the like), to the base station in such timeslots on the uplink, and the base station may be arranged to transmit data, such as bearer data and control signaling (e.g., paging and other overhead messages) to the UEs in such timeslots on the downlink. Further the base station or associated equipment may dynamically schedule transmissions of data in particular timeslots, and the base station and UEs may transmit according to that schedule.

In practice, a UE may, from time to time, determine its channel quality based on downlink air interface quality (e.g., downlink reference signal strength) and one or more other factors (e.g., the UE's specific antenna structure and receiver capability) and transmit to the base station a channel quality indicator (CQI) indicating the UE's determined channel quality. The base station may then determine from the reported CQI a particular modulation and coding scheme (MCS) to use for communication with the UE, and the base station may allocate air interface resources and schedule transmissions of data accordingly.

Some air interface protocols support both wideband and sub-band CQI reporting. With wideband CQI reporting, a single CQI value may represent an effective signal-to-interference-plus-noise ratio (SINR), for example, as observed by the UE over an entire channel bandwidth. While a channel-wide CQI value may reveal an overall channel quality, a channel-wide CQI value also masks variations in SINR across the channel that may be present due to frequency selective fading (deviation of the attenuation affecting a signal which varies with frequency) and/or inter-cell interference (interference from an adjacent base station that is communicating with other UEs).

On the other hand, with sub-band CQI reporting, a UE may be arranged to evaluate the reference signal in particular sub-bands of the channel bandwidth, and to provide the base station with a sub-band CQI report specifying CQI values respectively for various sub-bands. Such sub-band CQI reports, which are of a finer frequency granularity than channel-wide CQI reports, allow the base station to engage in frequency selective scheduling (FSS), whereby a base station schedules transmissions of data with the goal of allocating to each UE the resources that the base station estimates will be received with the best SINR by the UE.

Furthermore, to aid the base station in scheduling and allocating resources for transmission of data on the uplink, the base station may be arranged to evaluate the uplink channel quality. In order to facilitate this evaluation, UEs may be configured to periodically transmit to the base station an uplink control signal, such as a sounding reference signal (SRS). The reception quality of the uplink control signal may then be used by the base station to help evaluate uplink channel quality. For instance, evaluating the reception quality of the uplink control signal in the frequency domain may allow the base station to engage in FSS of the uplink resources. By way of example, the base station may allocate for use by a UE the particular resources that the base station estimates being able to receive with the best reception quality from the UE.

Additionally, the base station may be configured to engage in carrier aggregation. In wireless communication systems that support carrier aggregation, multiple carrier frequencies from either contiguous frequency bands or non-contiguous frequency bands can be aggregated to increase the bandwidth available to a UE. By way of example, according to the Long Term Evolution (LTE) Advanced air interface protocol, the maximum bandwidth for a data transaction between a base station and a UE using a single carrier frequency is 20 MHz. A base station may increase the maximum available bandwidth by engaging in carrier aggregation. For instance, the base station may increase the number of resource blocks provided to a UE by aggregating up to five carrier frequencies, and consequently increasing the maximum bandwidth to up to 100 MHz. Each aggregated carrier frequency is referred to as a component carrier.

OVERVIEW

One of the advantages of FSS is that a base station can dynamically assign resources for use by a particular UE in a portion of a frequency band where the UE has the best quality. For example, the base station may allocate for use by a UE the particular resources that the base station estimates being able to receive with the best reception quality from the UE. Similarly, the base station may allocate for use by a UE the particular resources that the base station estimates will be received with the best SINR by the UE. Therefore, using FSS can improve network efficiency and customer experience.

Unfortunately, FSS may also increase the amount of signaling that occurs between the base station and UEs and the amount of processing performed by the base station. For instance, to facilitate FSS, UEs may be configured to periodically report multiple sub-band CQI values for respective sub-bands rather than reporting a single channel-wide CQI value. The base station may then consider the multiple sub-band CQI values every millisecond to schedule transmissions on the downlink, rather than considering just a single wideband CQI value. Similarly, the base station may consider the reception quality of SRSs within multiple sub-bands to schedule transmissions on the uplink, rather than considering just an average reception quality over a wide frequency band.

Furthermore, with carrier aggregation, there are more frequency bands at issue, which may require even more processing by the base station. For example, to engage in FSS, the base station may need to consider multiple sub-band CQI values for multiple different frequency bands. And the base station may need to consider the reception quality of SRSs for multiple different frequency bands as well.

One solution to regulating the processor load of the base station may be to disable FSS when the base station is threshold processor loaded. For instance, if the processor load on the base station exceeds a threshold load, the base station may stop engaging in FSS, and continue scheduling transmissions using regular scheduling techniques. This overload mechanism may help regulate the processor load on the base station, but also necessarily eliminates the advantages of FSS.

Disclosed herein is a method and corresponding system to help address this problem. In accordance with this disclosure, a base station, or other entity, may be arranged to intelligently schedule resources based on a UE's use of carrier aggregation. In one instance, a base station may normally be configured to engage in FSS while serving UEs. Furthermore, when the base station is threshold processor loaded, the base station may be configured to use FSS for UEs that are being served with carrier aggregation, but not for UEs that are not being served with carrier aggregation. That is, when the base station is threshold processor loaded, for a given UE, the base station may determine if the UE is being served with carrier aggregation, and if so, the base station may not engage in FSS with the UE, but if not, the base station may use FSS to schedule transmissions with the UE.

Disabling FSS for UEs that are being served with carrier aggregation may reduce the processor load on the base station and still allow the UEs that are not being served with carrier aggregation to benefit from the use of FSS. At the same time, the UEs that are being served with carrier aggregation may still benefit from the increased bandwidth that the use of carrier aggregation provides.

In another instance, if a base station is threshold processor loaded, the base station may responsively use FSS for UEs being served with a small amount of frequency but not for UEs being served with a large amount of frequency. For example, the base station may use FSS for UEs being served on a 2 MHz channel but not for UEs being served on a 5 MHz channel.

Choosing to engage in FSS with UEs being served on a 2 MHz channel but not UEs being served with a 5 MHz channel may decrease the processor load on the base station. There are fewer sub-bands within a 2 MHz channel than within a 5 MHz channel. Consequently, engaging in FSS with UEs being served on a 2 MHz channel may require less processing by the base station than engaging in FSS with UEs being served on a 5 MHz channel. Although the base station may be prevented from engaging in FSS with the UEs being served with a 5 MHz channel, the UEs being served with a 5 MHz channel may still be able to achieve faster data rates than UEs being served with a 2 MHz channel, due to the increased bandwidth of a 5 MHz channel as compared to a 2 MHz channel.

Accordingly, in one respect, disclosed is a method that may be implemented in a wireless communication system in which a base station of a cellular radio access network (RAN) normally engages in FSS while serving a plurality of UEs. The method may involve determining that (i) an individual UE is being served with carrier aggregation and (ii) a processer load of the base station is greater than a threshold load. The method may then involve, responsive to the determining that the individual UE is being served with carrier aggregation and the processor load of the base station is greater than the threshold load, causing the base station to allocate an extent of resources to the individual UE without using FSS.

In another respect, disclosed is an eNodeB configured to engage in FSS while serving a plurality of UEs. The eNodeB may include an antenna structure for wirelessly communicating with the plurality of UEs over an air interface. The eNodeB may further include a controller arranged to (i) determine whether individual UEs of the plurality of UEs are being served with carrier aggregation, and (ii) based on the determination regarding whether the individual UEs are being served with carrier aggregation, control which UEs of the plurality of UEs the eNodeB allocates resources to using FSS and which UEs of the plurality of UEs the eNodeB allocates resources to without using FSS.

Still further, in another respect, disclosed is a method that may be implemented in a wireless communication system in which a base station of a cellular RAN normally engages in FSS while serving a plurality of UEs. The method may involve determining that (i) an amount of frequency with which the base station is serving an individual UE is greater than a frequency threshold and (ii) a processor load of the base station is greater than a threshold load. The method may then involve, responsive to the determining that the amount of frequency with which the base station is serving the individual UE is greater than the frequency threshold and the processor load of the base station is greater than the threshold load, causing the base station to allocate an extent of resources to the individual UE without using FSS.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is an example of a table mapping CQI to MCS.

DETAILED DESCRIPTION

Figure 1:
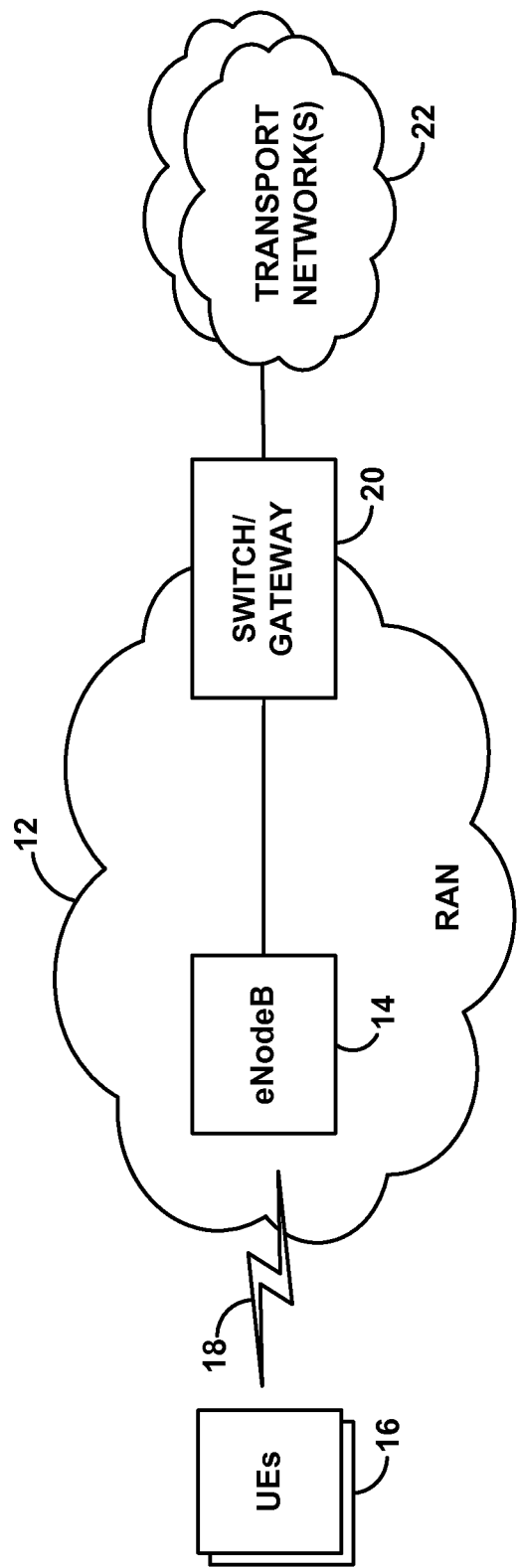
FIG. 1 is a simplified block diagram of an example wireless communication system in which the present disclosure can be implemented.

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a radio access network (RAN) 12 having a representative eNodeB 14, eNodeB 14 being arranged to serve UEs 16 in a coverage area through an air interface 18. The eNodeB may be a macro base station that is positioned at a fixed location and providing fairly wide coverage from that location. Alternatively, the eNodeB may be a small cell base station that is currently located at a particular location and may provide more restricted coverage from that location.

RAN 12 further includes by way of example a switch or gateway 20 that provides connectivity with one or more transport networks 22, such as the PSTN or the Internet for instance. With this arrangement, each UE that is in coverage of the eNodeB and that is suitably equipped may register or attach with the RAN and may engage in air interface communication with the eNodeB so as to communicate in turn with various remote entities on the transport network(s) and/or with other UEs served by the RAN. Numerous variations from this arrangement are possible, however. For instance, the RAN may include more than one switch or gateway and may include various components between each switch or gateway and the transport network(s).

In this arrangement, the air interface 18 may be configured according to a particular air interface protocol, and the UEs and eNodeB may be programmed or otherwise configured to operate according to that protocol. Examples of existing air interface protocols include, without limitation, Orthogonal Frequency Division Multiple Access (OFDMA (e.g., LTE or Wireless Interoperability for Microwave Access (WiMAX))), Code Division Multiple Access (CDMA) (e.g., 1×RTT and 1×EV-DO), and Global System for Mobile Communications (GSM), among others. According to the air interface protocol, air interface 18 may thus define a plurality of resource blocks for carrying communications between the UEs and the eNodeB.

As noted above, variations on the arrangement shown are possible. To help illustrate features of the present disclosure, the remainder of this document will focus on an LTE system by way of example. Those of ordinary skill in the art will readily appreciate, however, that the disclosed principles can be applied as well in other types of wireless communication systems, with variations where appropriate.

Figure 2:
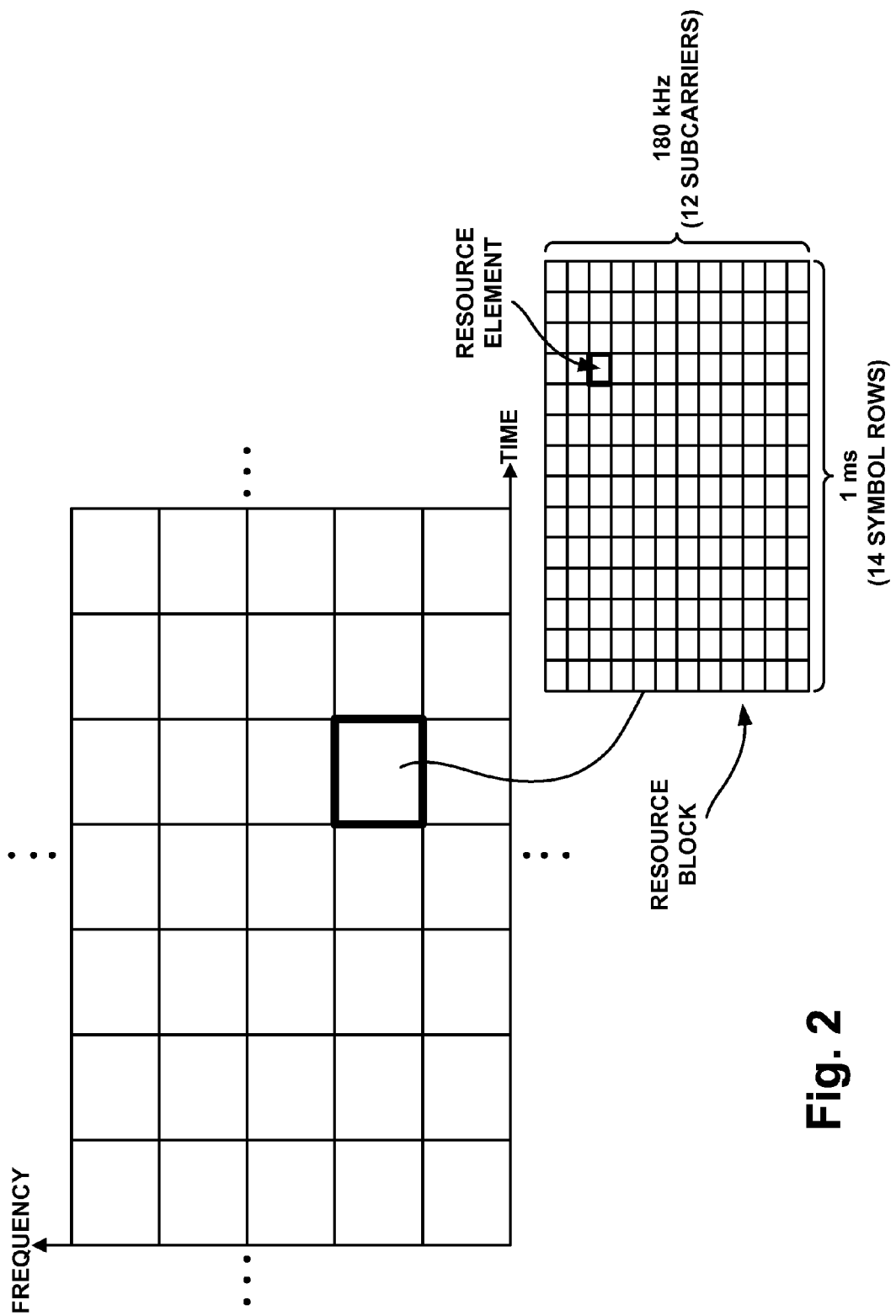
FIG. 2 is a diagram of example LTE resource blocks.

FIG. 2 is next a diagram of example LTE resource blocks. In accordance with a recent version of LTE, the air interface on both the downlink and uplink may span a particular bandwidth (such as 1.4 MHz, 3 MHz, 5 MHz, 10 MHz, or 20 MHz) that is divided primarily into subcarriers that are spaced apart from each other by 15 kHz. Further the air interface may be divided over time into a continuum of 10 millisecond frames, with each frame being further divided into ten 1 millisecond subframes. In each 1 millisecond subframe, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 microseconds each, with each symbol segment spanning the 12-subcarriers of the resource block and thus each supporting transmission of 12 orthogonal frequency division multiplexing (OFDM) symbols in respective "resource elements". Thus, the eNodeB and a served UE may transmit symbols to each other in these resource elements, particularly on subcarriers that are spaced apart from each other by 15 kHz and in time segments spanning 67 microseconds each.

The LTE air interface may then define various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the eNodeB can allocate on an as-needed basis to carry transmissions to particular UEs, with still other resource elements being reserved to define a downlink reference signal. Likewise, on the uplink, certain resource elements across the bandwidth may be reserved to define a physical uplink control channel (PUCCH), and other resource elements may be reserved to define a physical uplink shared channel (PUSCH) that the eNodeB can allocate on an as-needed basis to carry transmissions from particular UEs.

Depending on the bandwidth of the coverage area, the air interface will thus have a particular limited extent of resources (resource units, such as resource blocks and resource elements) that the eNodeB can allocate per unit time, such as per subframe. In practice, the eNodeB may manage this allocation in accordance with the type of communication in which the UE is engaged and in accordance with the UE's channel quality.

In particular, the UE and eNodeB may be dynamically set to use a particular modulation and coding scheme (MCS) selected based on the UE's channel quality, with each MCS supporting a corresponding data rate. For instance, when the UE's channel quality is poor, the eNodeB and UE may use a low-order MCS such as Quadrature Phase Shift Keying (QPSK), in which each symbol represents just 2 coded data bits. Whereas, if the UE's channel quality is medium, the eNodeB and UE may use a mid-order MCS such as 16 Quadrature Amplitude Modulation (16QAM), in which each symbol represents 4 coded data bits. And if the UE's channel quality is high, the eNodeB and UE may use a high-order MCS such as 64QAM, in which each symbol represents 6 coded data bits. Finer gradations of MCS and coding rate are possible as well.

As discussed above, in practice, a UE being served by the eNodeB 14 may from time to time determine its channel quality based on downlink air interface quality (e.g., downlink reference signal strength) and one or more other factors (e.g., UE's capabilities) and transmit to the eNodeB a CQI indicating the UE's determined channel quality. For instance, the eNodeB may broadcast the reference signal in predefined resource elements distributed throughout the bandwidth and throughout each physical resource block. The UE may then be arranged to periodically transmit to the eNodeB a CQI report established based on the UE's evaluation of the reference signal. This CQI report may contain at least one 4-bit integer CQI, indicative of a suitable downlink transmission rate (e.g., MCS) that the eNodeB can use for data communications to the UE.

Depending on configuration and operational state, the UE may be arranged to evaluate the reference signal across the entire channel bandwidth so as to establish and report a channel-wide CQI value generally for the entire channel bandwidth, or the UE may be arranged to evaluate the reference signal in particular sub-bands consisting of specific ranges of physical resource blocks, and to provide the eNodeB with a sub-band CQI report specifying CQI values respectively for various sub-bands. The UE may be arranged to transmit the channel-wide CQI report or sub-band CQI report to the eNodeB periodically, in an uplink control channel or along with uplink data transmission to the eNodeB. And the eNodeB may be arranged to respond to the channel-wide CQI report or sub-band CQI report by setting and applying a suitable MCS respectively for downlink data transmission to the UE.

For instance, the eNodeB may maintain or otherwise have access to a table that maps CQIs with MCSs, ranging from a lowest-level CQI value correlated with a lowest-order MCS to a highest-level CQI value correlated with a highest-order MCS. FIG. 3 depicts such a CQI-MCS table, showing CQI indexes ranging from 1 up to 15 and MCSs correspondingly ranging from QPSK with a coding rate of 78/1024 up to 64QAM with a coding rate of 948/1024. The coding rate is a measure of how effectively data is transmitted in a subframe. In particular, the coding rate is a ratio of a data rate that is allocated for a subframe and the maximum data rate that can theoretically be allocated for the subframe. The data rate allocated for a subframe may vary depending on the number of redundancy bits inserted during coding, creating different possible coding rates for a particular modulation scheme.

In this table, each MCS is thus a combination of modulation type (e.g., ranging from a lowest-order modulation scheme QPSK to a highest order modulation scheme of 64QAM) and coding rate (e.g., ranging from 78/1024 to 948/1024), though in other examples the MCS could simply be the modulation type or could take still other forms. In general, lower-order modulation types tend to provide lower data rates but more reliable transmission in the face of noise, as compared with higher-order modulation types.

Applying this table, the eNodeB may be configured to select an MCS for a next physical layer transmission based on the latest CQI that the eNodeB received from the UE. For example, if the latest CQI that the eNodeB received from the UE was a channel-wide CQI report indicating a CQI of 5, the eNodeB would modulate the next physical resource block to the UE with QPSK at a coding rate of 449/1024. Alternatively, the eNodeB may consider a most recent group of channel-wide CQI reports received from the UE to select an MCS. By way of example, the eNodeB may determine the average channel-wide CQI value from the four most recent channel-wide CQI reports received from the UE, and select a MCS corresponding to the average of the four channel-wide CQI values.

If the eNodeB is configured to engage in FSS while serving a UE, the UE may provide the eNodeB with a sub-band CQI report specifying CQI values respectively for various sub-bands. The eNodeB may then consider the CQI values for each respective sub-band, and schedule transmissions of data with the goal of allocating to each UE the resources that the eNodeB estimates will be received with the best quality (e.g., best SINR) by the UE. For example, the eNodeB may opt to schedule communications with the UE in the sub-band(s) that the UE reports with the highest CQI. This may enable the eNodeB to communicate with the UE with a highest MCS.

In practice, the eNodeB may receive one or more sub-band CQI reports from a UE. Each sub-band report may include a vector of CQI values, and each CQI value may be representative of a SINR observed by the UE over the sub-band. For instance, each CQI value may be representative of a SINR observed for a 180 kHz sub-band. The eNodeB may then evaluate the CQI values to determine which sub-band is best. In particular, the eNodeB may evaluate the CQI values to determine which sub-band(s) is associated with the highest CQI value. And the eNodeB may then schedule communications with the UE in the sub-band(s) associated with the highest CQI value.

The eNodeB can use a similar process for scheduling allocation of resources on the uplink, making use of SRSs to evaluate the uplink channel quality. In order to facilitate this evaluation, a UE may be configured to periodically transmit to the eNodeB an uplink control signal, such as an SRS. The UE may transmit the SRS at a predetermined time, within a symbol segment that is set aside to carry SRS signaling. Depending on configuration and operational state, the UE may be configured to transmit an SRS as often as every 2 milliseconds or as rarely as every 320 milliseconds. And the eNodeB would be configured to expect the SRS from the UE depending on the periodicity with which the UE is scheduled to transmit the SRS. The eNodeB can then evaluate a received signal power of the SRS.

Figure 4:
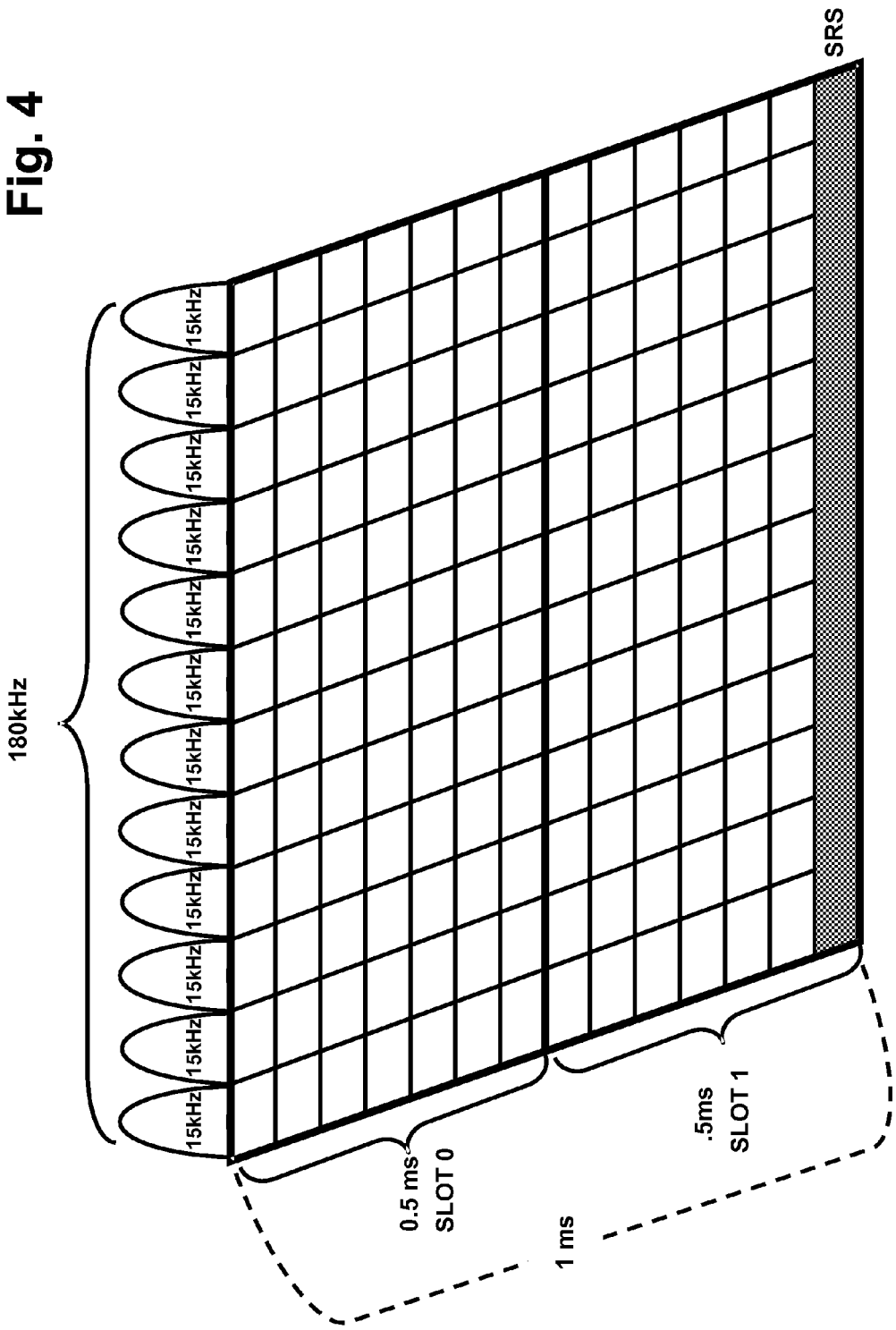
FIG. 4 is a diagram of an example LTE resource block.

FIG. 4 depicts a diagram of an example LTE uplink resource block including a signal segment that is reserved to carry SRS signaling. As shown in FIG. 4, the UE may transmit the SRS during the last symbol segment of the resource block, and across all sub-carriers of the resource block. In practice, the UE may also transmit the SRS across the entire frequency bandwidth of the uplink so that the eNodeB can approximate the air-interface quality across all available frequencies. The reception quality of the SRS (e.g., a received power of the SRS) may then be used by the eNodeB to evaluate uplink channel quality, and allocate resource blocks accordingly.

An SRS may be transmitted, coded, or modulated in a manner that distinguishes it from SRSs transmitted by other UEs, and the eNodeB may be arranged to evaluate the UE's SRS independently of SRSs received from the other UEs. As one example, a UE may generate an SRS using a cyclic shift in a predetermined sequence (e.g., a Zadoff-Chu sequence), such that different SRSs generated from the predetermined sequence are orthogonal. Consequently, multiple UEs can transmit an SRS to the eNodeB on the same time and frequency resource. A UE may also be configured to transmit an SRS on every other sub-carrier. Therefore, many UEs can transmit an SRS simultaneously, and the eNodeB can associate each received with SRS with a respective UE.

The eNodeB may evaluate the signal power of an SRS received from a UE to facilitate scheduling communications with the UE on the uplink. By way of example, the UE may determine an average received signal power of the SRS over an entire frequency band, and based on the average received signal power of the SRS, the eNodeB may select an MCS to use for communicating with the UE on the uplink. The eNodeB may then send the MCS to the UE. And the UE may then be arranged to communicate with the eNodeB on the uplink using the selected MCS.

If the eNodeB is configured to engage in FSS with a UE, the eNodeB may be arranged to determine the received power of the UE's SRS within multiple sub-ranges of the uplink frequency channel. For instance, the eNodeB may be arranged to determine the average received signal power within 180 kHz sub-bands of the uplink frequency channel. The eNodeB may then evaluate the received signal powers to determine the sub-band(s) where the UE's SRS was received with the highest power. And the eNodeB may then opt to schedule communications with the UE in the sub-range(s) of the uplink frequency channel corresponding to the highest received power. This may enable the eNodeB to receive communications from the UE using a highest MCS.

Thus, considering possibly both the downlink FSS process and the uplink FSS process, engaging in FSS may involve a significant amount of processing by the eNodeB within a short time frame. By way of example, for each UE the eNodeB is serving, the eNodeB may consider multiple sub-band CQI values every millisecond to schedule transmissions on the downlink, and consider the reception quality of an SRS within multiple sub-bands every millisecond to schedule transmissions on the uplink.

Furthermore, in line with the discussion above, with carrier aggregation, there are more frequency bands at issue, which may require even more processing by the eNodeB. In LTE Advanced, carrier aggregation is used to increase the maximum bandwidth available to UE, and thereby increase the data rate of communications between the eNodeB and the UE. In particular, multiple carrier frequencies from either contiguous or non-contiguous frequency bands may be aggregated to increase the bandwidth of the downlink and/or uplink. By way of example, the eNodeB may aggregate two contiguous 1.4 MHz frequency carriers on the downlink, yielding 2.8 MHz frequency channel. As another example, the eNodeB may aggregate a first 3 MHz frequency carrier from a first downlink frequency band with a second 3 MHz frequency carrier from a second frequency band, creating a 6 MHz frequency channel. The frequency carriers aggregated during carrier aggregation are referred to as component carriers. Each component carrier may have a bandwidth of 1.4, 3, 5, 10, 15, or 20 MHz, and up to five component carriers can be aggregated at once.

When an eNodeB is arranged to engage in both FSS and carrier aggregation, the eNodeB may then evaluate sub-band CQI values across all of the component carriers to schedule communications on the downlink for a UE. Similarly, when an eNodeB is arranged to engage in FSS and carrier aggregation, the eNodeB may evaluate the received signal power of an SRS within sub-ranges of all of the component carriers to schedule communications on the uplink for a UE. Thus, engaging in carrier aggregation may also contribute to overloading a processing unit of the eNodeB.

In accordance with an example method, based on whether an individual UE is being served with carrier aggregation, the eNodeB will control whether the eNodeB allocates resources to the individual UE using FSS or the eNodeB allocates resources to the individual UE without using FSS. Further, in accordance with another example method, based on whether an individual UE is being served with an amount of frequency that is greater than a frequency threshold, the eNodeB will control whether the eNodeB allocates resources to the individual UE using FSS or the eNodeB allocates resources to the individual UE without using FSS.

The example methods may be implemented in a wireless communication system in which the eNodeB is normally configured to engage in FSS while serving a plurality of UEs. In other words, the eNodeB may be configured by default to schedule communications with a UE using FSS on the downlink, the uplink, or both, in line with the discussion above. However, based on whether an individual UE is being served with carrier aggregation, or based on whether an individual UE is being served with an amount of frequency that is greater than a frequency threshold, the eNodeB may determine whether to use FSS or not use FSS for allocating resources with the individual UE. For instance, if the UE is being served without carrier aggregation, then the eNodeB may receive and consider sub-band reports regarding the downlink. But if the UE is being served with carrier aggregation, then the eNodeB may forgo application of FSS for that UE, so the eNodeB would consider channel-wide SRS on the uplink and the eNodeB would cause the UE to provide channel-wide CQI reports regarding the downlink.

In practice, the eNodeB may signal to the UE to inform the UE whether to send wide-band CQI reports or channel-wide CQI reports. For example, if the UE is being served with carrier aggregation, the eNodeB may then send a message to the UE indicating that the UE should send channel-wide CQI reports. On the other hand, if the UE is being served without carrier aggregation, the eNodeB may send a message to the UE indicating that the UE should send sub-band CQI reports.

Additionally, if the UE is being served with carrier aggregation, the eNodeB may indicate which component carriers the eNodeB is using to communicate with the UE. For instance, the eNodeB may send a message(s) to the UE on a PDCCH that identifies a primary component carrier and one or more secondary component carriers. And the UE may then be arranged to determine CQI values for the component carriers, and provide an SRS(s) across those component carriers.

In one example implementation, an eNodeB may be arranged to determine whether individual UEs of a plurality of UEs are being served with carrier aggregation. Based on the determination regarding whether the individual UEs are being served with carrier aggregation, the eNodeB may then be arranged to control which UEs of the plurality of UEs the eNodeB allocates resources to using FSS and which UEs of the plurality of UEs the eNodeB allocates resources to without using FSS. For instance, the eNodeB may be arranged to use FSS for allocating resources to UEs of the plurality of UEs that are not being served with carrier aggregation, but to not use FSS for allocating resources to UEs of the plurality of UEs that are being served with carrier aggregation.

Furthermore, the eNodeB may be arranged to control which UEs the eNodeB allocates resources to based on a comparison between a processor load of a processor of the eNodeB and a threshold load. For instance, when the processor load is less than the threshold load, the eNodeB may be arranged to engage in FSS while serving UEs. But when the processor load is greater than the threshold load, the eNodeB may be arranged to engage in FSS to allocate resources to UEs that are not being served with carrier aggregation, but to not engage in FSS to allocate resources to UEs that are being served with carrier aggregation.

Figure 5:
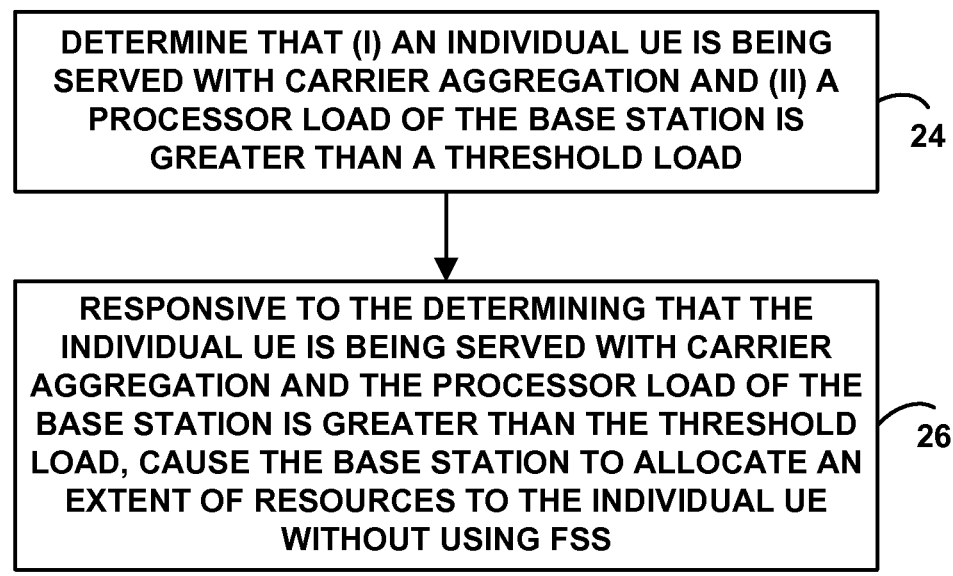
FIG. 5 is a flow chart depicting functions that can be carried out in accordance with exemplary embodiments.

FIG. 5 is next a flow chart depicting functions of a process that can be carried out in a wireless communication system. These functions may be carried out by a base station (e.g., an eNodeB) of a cellular RAN that normally engages in FSS while serving a plurality of UEs, or the functions may be carried out by one or more other entities of a RAN.

As shown in FIG. 5, at block 24 the method involves determining that (i) an individual UE is being served with carrier aggregation and (ii) a processor load of the base station is greater than a threshold load. And at block 26, the method then involves responsive to determining that the individual UE is being served with carrier aggregation and the processor load of the base station is greater than the threshold load, causing the base station to allocate an extent of resources to the individual UE without using FSS.

In line with the discussion above, the base station may normally be configured to engage in FSS by default while serving a plurality of UEs. For instance, the base station may allocate downlink resources to the plurality of UEs based on sub-band CQI values reported respectively by the plurality of UEs. Additionally or instead, the base station may allocate resources to the plurality of UEs based on a received power over a set of frequencies of SRSs received respectively from the plurality of UEs.

In practice, the base station may determine whether an individual UE is being served with carrier aggregation by determining whether the individual UE is being served with two or more component carriers on either the downlink or the uplink. For instance, if the individual UE is being served with two or more component carriers on the downlink or the individual UE is being served with two or more component carriers on the uplink, the base station may determine that the individual UE is being served with carrier aggregation. If, however, the individual UE is not being served with two or more component carriers on the uplink and the individual UE is not being served with two or more component carriers on the downlink, the base station may determine that the individual UE is not being served with carrier aggregation.

Alternatively, the base station may determine whether an individual UE is being served with carrier aggregation by determining whether the individual UE is being served with two or more component carriers on the downlink. For instance, if the individual UE is being served with two or more component carriers on the downlink, the base station may determine that the individual UE is not being served with carrier aggregation. On the other hand, if the individual UE is being served with two or more component carriers on the downlink, the base station may determine that the individual UE is not being served with carrier aggregation. Similarly, the base station may determine whether an individual UE is being served with carrier aggregation by determining whether the individual UE is being served with two or more component carriers on the uplink.

The base station may determine the processor load based on how often the processor is idle during a time interval. For instance, if the processor is idle during 20% of a 10 millisecond time interval, the processor load may be 80%. To determine whether the processor load of the base station is greater than a threshold load, the base station may compare the most recent processor load measurement to the threshold load. As an example, if the most recent processor load measurement is 85% and the threshold load is 80%, the base station may determine that the processor load is greater than the threshold load.

Advantageously, causing the base station to allocate resources to the individual UE without using FSS when the processor load is greater than the threshold load may reduce the processor load on the base station. Such a reduction in the processor load may permit the base station to still use FSS for other UEs that are not being served with carrier aggregation, without overloading the processor of the base station. At the same time, the individual UE may still benefit from the increased bandwidth that the use of carrier aggregation provides.

Figure 6:
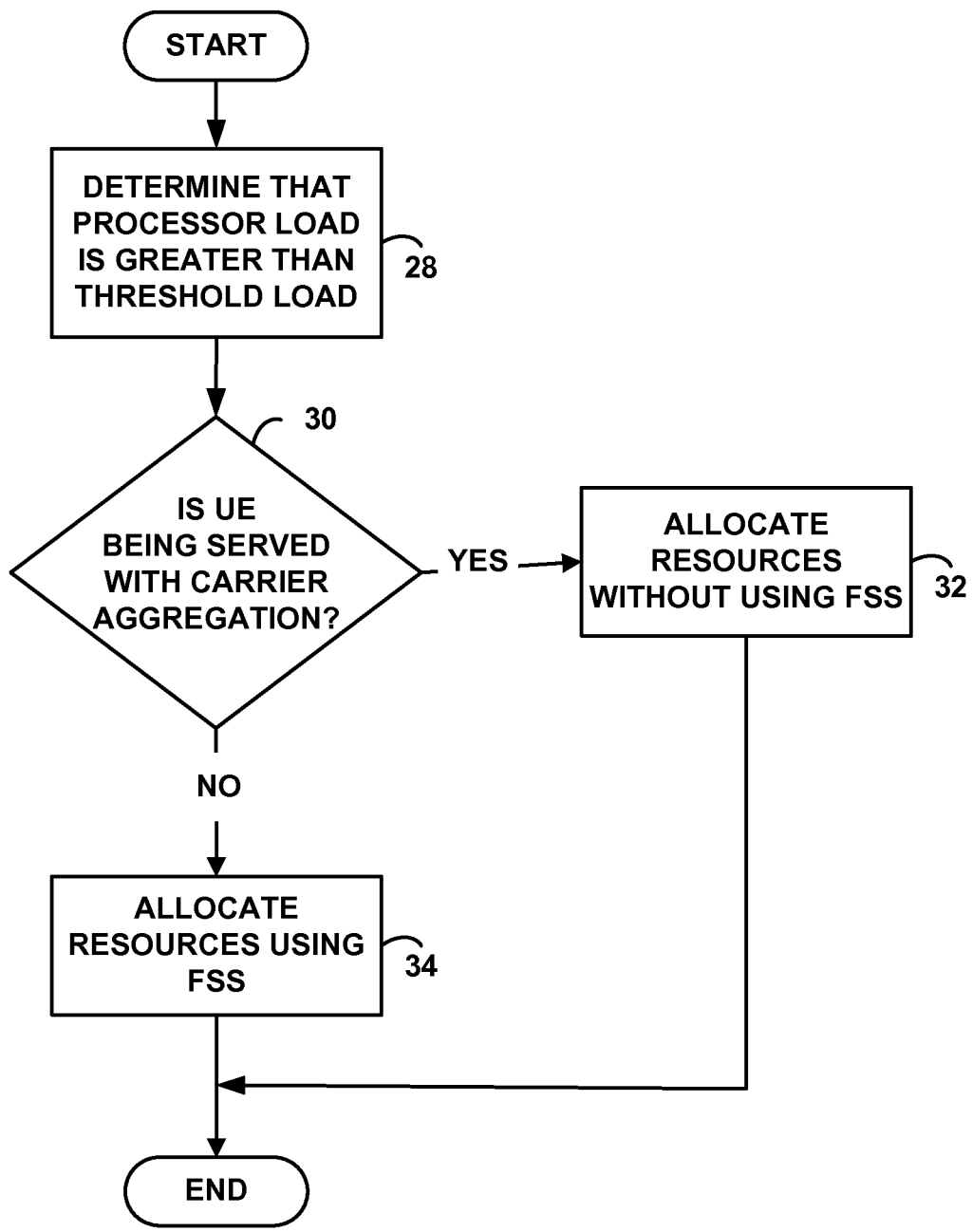
FIG. 6 is another flow chart depicting functions that can be carried out in accordance with exemplary embodiments.

FIG. 6 is next another flow chart depicting functions of a method that can be carried out in accordance with exemplary embodiments. These functions may be carried out by a base station (e.g., an eNodeB) of a cellular RAN that normally engages in FSS while serving a plurality of UEs, or the functions may be carried out by one or more other entities of a RAN.

As shown in FIG. 6, at block 28, the method involves determining that a processor load of the base station is greater than a threshold load. As discussed above, the base station may compare the most recent processor load measurement to threshold load. In one instance, the threshold load may be a percentage of the processor's maximum load, such as 70%, 85%, or 90%.

At block 30, the method then involves determining whether an individual UE is being served with carrier aggregation. By way of example, the base station may determine whether the UE is being served with carrier aggregation based on whether the UE is being served by the base station with two or more component carriers on either the downlink or the uplink.

If the base station determines that the individual UE is being served with carrier aggregation, at block 32, the base station may then responsively allocate resources to the individual UE without using FSS. On the other hand, if the base station determines that the individual UE is not being served with carrier aggregation, at block 34, the base station may then responsively allocate resources to the individual UE using FSS.

More generally, as discussed above, when the processor load of the eNodeB is greater than a threshold load, the eNodeB may be arranged to control whether or not the eNodeB allocates resources to individual UEs using FSS based on an amount of frequency with which the eNodeB is serving the individual UEs. For example, responsive to determining that (i) the processor load is greater than a threshold load and (ii) an amount of frequency with which the eNodeB is serving an individual UE is greater than a frequency threshold, the eNodeB may allocate an extent of resources to the individual UE without using FSS. Similarly, responsive to determining that (i) the processor load is greater than the threshold load and (ii) an amount of frequency with which the eNodeB is serving an individual UE is less than a frequency threshold, the eNodeB may allocate an extent of resources to the individual UE using FSS.

Figure 7:
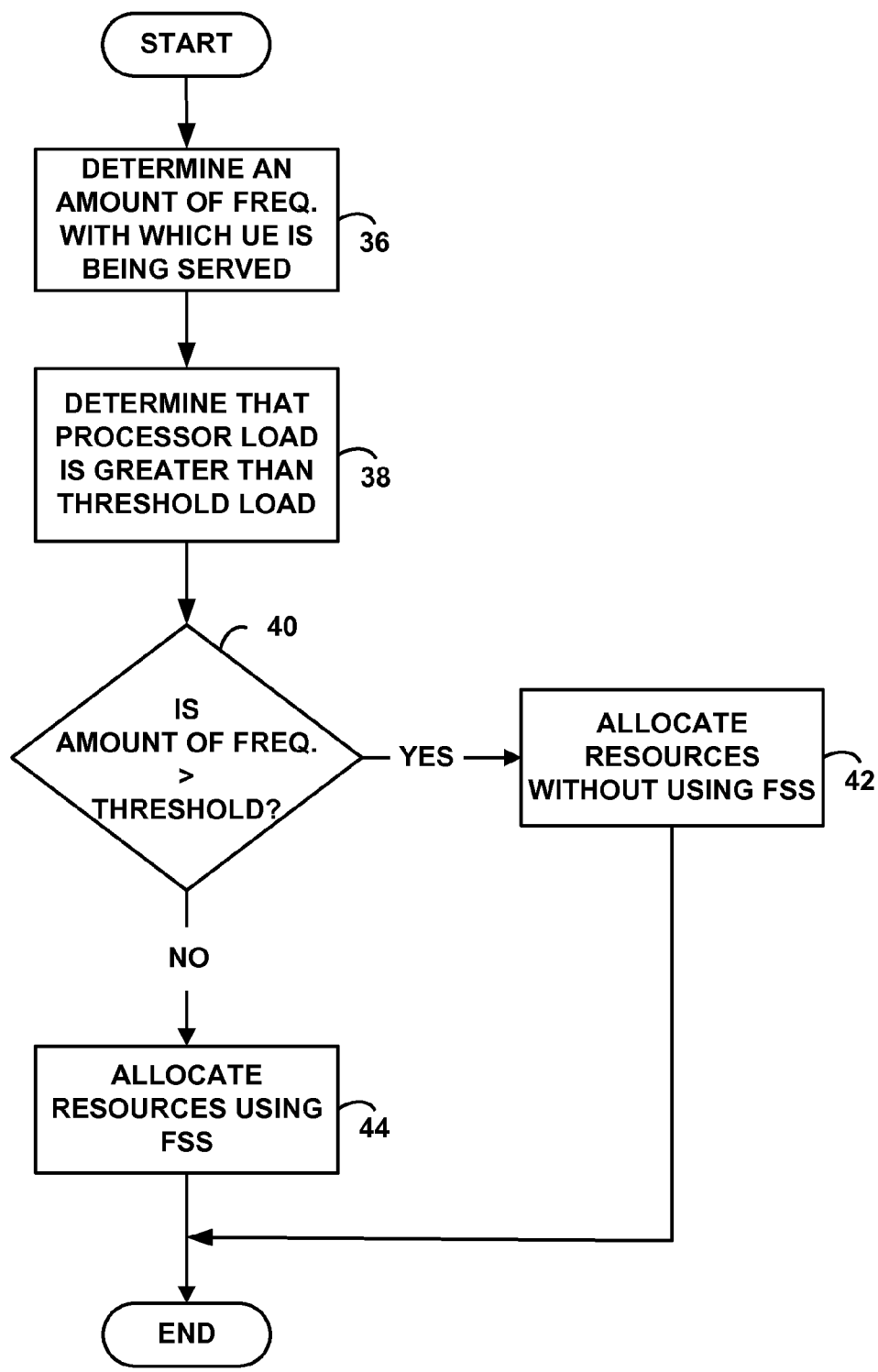
FIG. 7 is still another flow chart depicting functions that can be carried out in accordance with exemplary embodiments.

FIG. 7 is next a flow chart depicting functions of this process. At block 36, the base station may determine an amount of frequency with which an individual UE is being served. For instance, the base station may determine a size of particular bandwidth of a downlink channel on which the base station is operating or an uplink channel on which the individual UE is operating. In another example, the amount of frequency may be a number of frequency bands (e.g., the number of downlink frequency bands, the number of uplink frequency bands, or both).

Further, at block 38, the base station may determine that the processor load of the base station is greater than a threshold load. At block 40, the base station may then compare the amount of frequency, determined at block 36, to a frequency threshold.

By way of example, the base station may determine that the individual UE is being served on a 3 MHz channel on the downlink, and compare the 3 MHz channel to a frequency threshold of 2.5 MHz. Because the 3 MHz channel is less than the 2.5 MHz frequency threshold, at block 42, the base station may allocate resources to the individual UE without using FSS. On the other hand, if the base station determines at block 36 that another UE is being served on a 1.4 MHz channel, the base station may determine at block 40 that the amount of frequency with which the other UE is being served is less than the frequency threshold. Accordingly, at block 44, the base station may allocate resources to the other UE using FSS.

As another example, the frequency threshold may be a number of frequency bands, such as two. If the base station determines that the base station is serving an individual UE with two frequency bands (e.g., a downlink band and an uplink band), the base station may responsively allocate resources to the individual UE using FSS. On the other hand, if the base station determines at block 36 that the base station is serving an individual UE with more than two frequency bands (e.g., two downlink bands and one uplink band. or one downlink band and two uplink bands), the base station may responsively allocate resources to the individual UE without using FSS.

Figure 8:
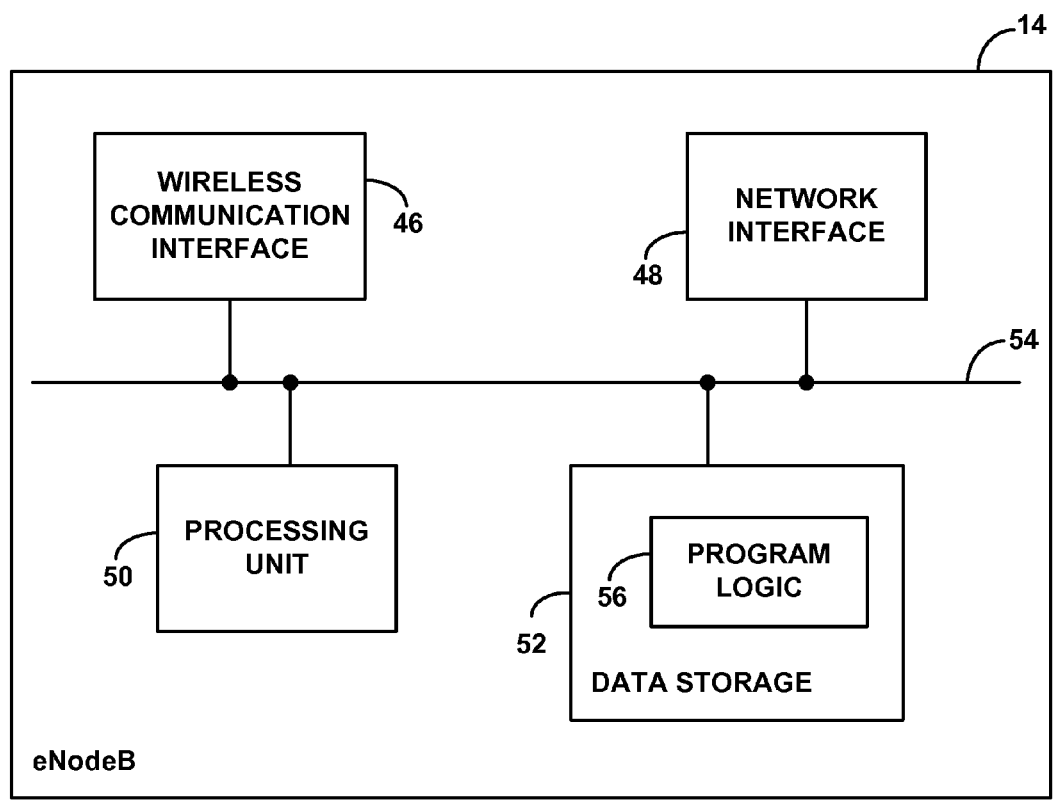
FIG. 8 is simplified block diagram of an example eNodeB, in accordance with exemplary embodiments.

Finally, FIG. 8 is a simplified block diagram of a representative eNodeB 14 (whether macro, femto or the like), illustrating some of the components that can be included in such an entity. As shown in FIG. 8, the representative eNodeB 14 includes a wireless communication interface 46, a network interface 48, a processing unit 50, and data storage 52, all of which may be coupled together by a system bus, network or other connection mechanism 54.

Wireless communication interface 46 may function to engage in air interface communication with served UEs, such as UEs 16. As such, wireless communication interface 46 may comprise an antenna arrangement (not shown), which may be tower mounted, and associated components such as a power amplifier and a cell site modem (not shown), so as to transmit and receive bearer and control data. Network interface 48 may then comprise a wired or wireless interface for communicating with the switch/gateway 20 for instance.

Processing unit 50 may then comprise one or more general purpose processors (e.g., microprocessors) and/or one or more special-purpose processors (e.g., digital signal processors and/or application specific integrated circuits) and may be integrated in whole or in part with the wireless communication interface 46. And data storage 52 may comprise one or more volatile and/or non-volatile storage components, such as magnetic, optical, flash, or other types of non-transitory computer readable media, and may be integrated in whole or in part with processing unit 28.

As shown, data storage 52 may store program logic 56 (e.g., machine language instructions), executable by processing unit 50 to carry out various eNodeB functions described herein. For instance, the program logic 56 may be executable to cause the eNodeB to control which UEs the eNodeB allocates resources to using FSS and which UEs the eNodeB allocates resources to without using FSS, in accordance with the present methods.

In line with the discussion above, the eNodeB may be configured by default to allocate resources to UEs using FSS. Additionally, the eNodeB may be configured to determine whether a load of the processing unit 50 is greater than a threshold load. In response to determining that the load is greater than the threshold load, the eNodeB may be configured to enable the use of FSS for allocating resources to UEs that are not being served with carrier aggregation and disable the use of FSS for allocating resources to UEs that are not being served with carrier aggregation.

Further in line with the discussion above, the eNodeB may be arranged to determine whether an individual UE is being served with carrier aggregation based on a number of downlink component carriers with which the eNodeB is serving the individual UE, a number of uplink component carriers with which the eNodeB is serving the individual UE, or based on a number of downlink and uplink component carriers with which the eNodeB is serving the individual UE.

Moreover, also in line with the discussion above, in some examples, the eNodeB may be configured to determine that (i) an amount of frequency with which the eNodeB is serving an individual UE is greater than a frequency threshold and (ii) a processor load of the eNodeB is greater than a threshold load. Responsive to determining that the amount of frequency is greater than the frequency threshold and that the processor load is greater than the threshold load, the eNodeB may be configured to allocate an extent of resources to the individual UE without using FSS. Additionally, responsive to determining that an amount of frequency with which the eNodeB is serving another UE is less than a frequency threshold and that the processor load of the eNodeB is greater than the threshold load, the eNodeB may be configured to allocate an extent of resources to the other UE using FSS.

Exemplary embodiments have been described above. It should be understood, however, that variations from these embodiments are possible, while remaining within the scope of the invention.

We claim:

1. In a wireless communication system in which a base station of a cellular radio access network (RAN) normally engages in frequency selective scheduling (FSS) while serving a plurality of user equipment devices (UEs), a method comprising:
   determining that (i) an individual UE is being served with carrier aggregation and (ii) a processor load of the base station is greater than a threshold load;
   responsive to the determining that the individual UE is being served with carrier aggregation and the processor load of the base station is greater than the threshold load, causing the base station to allocate an extent of resources to the individual UE without engaging in FSS with the individual UE;
   determining that another UE is not being served with carrier aggregation; and
   responsive to the determining that the other UE is not being served with carrier aggregation, causing the base station to allocate an extent of resources to the other UE by engaging in FSS with the other UE.

2. The method of claim 1, wherein engaging in FSS while serving the plurality of UEs comprises allocating resources to the plurality of UEs based on sub-band channel quality indicator (CQI) values reported respectively by the plurality of UEs.

3. The method of claim 1, wherein engaging in FSS while serving the plurality of UEs comprises allocating resources to the plurality of UEs based on a received power over a set of frequencies of sounding reference signals (SRSs) received respectively from the plurality of UEs.

4. The method of claim 1, wherein determining that the individual UE is being served with carrier aggregation comprises determining that the individual UE is being served with two or more component carriers on a downlink.

5. The method of claim 1, wherein determining that the individual UE is being served with carrier aggregation comprises determining that the individual UE is being served with two or more component carriers on an uplink.

6. The method of claim 1, wherein the extent of resources allocated to the individual UE comprises resources selected from the group consisting of downlink resources and uplink resources.

7. An eNodeB configured to use frequency selective scheduling (FSS) while serving a plurality of user equipment devices (UEs), comprising:
   an antenna structure for wirelessly communicating with the plurality of UEs over an air interface; and
   a controller arranged to (i) determine whether individual UEs of the plurality of UEs are being served with carrier aggregation, and (ii) based on the determination regarding whether the individual UEs are being served with carrier aggregation, control which UEs of the plurality of UEs the eNodeB allocates resources to using FSS and which UEs of the plurality of UEs the eNodeB allocates resources to without using FSS,
   wherein controlling, based on the determination regarding whether the individual UEs are being served with carrier aggregation, which UEs of the plurality of UEs the eNodeB allocates resources to using FSS and which UEs of the plurality of UEs the eNodeB allocates resources to without using FSS comprises:
   causing the eNodeB to use FSS for allocating resources to UEs of the plurality of UEs that are not being served with carrier aggregation, and
   causing the eNodeB to not use FSS for allocating resources to UEs of the plurality of UEs that are being served with carrier aggregation.

8. The eNodeB of claim 7, wherein the controller comprises a processor, data storage, and program instructions stored in the data storage and executable by the processor to carry out the determining and the controlling.

9. The eNodeB of claim 8, wherein the controller is further arranged to:
   determine whether a load of the processor is greater than a threshold load; and
   carry out the controlling in response to determining that the load of the processor is greater than the threshold load.

10. The eNodeB of claim 7, wherein using FSS for allocating resources to the UEs of the plurality of UEs that are not being served with carrier aggregation comprises allocating resources based on sub-band channel quality indicator (CQI) values reported respectively by the UEs of the plurality of UEs that are not being served with carrier aggregation.

11. The eNodeB of claim 7, wherein using FSS for allocating resources to the UEs of the plurality of UEs that are not being served with carrier aggregation comprises allocating resources based on a received power over a set of frequencies of sounding reference signals (SRSs) received respectively from the UEs of the plurality of UEs that are not being served with carrier aggregation.

12. The eNodeB of claim 7, wherein determining whether the individual UEs of the plurality of UEs are being served with carrier aggregation comprises determining whether the individual UEs are being served with two or more component carriers on a downlink.

13. The eNodeB of claim 7, wherein determining whether the individual UEs of the plurality of UEs are being served with carrier aggregation comprises determining whether the individual UEs are being served with two or more component carriers on an uplink.

14. In a wireless communication system in which a base station of a cellular radio access network (RAN) normally engages in frequency selective scheduling (FSS) while serving a plurality of user equipment devices (UEs), a method comprising:

determining that (i) an amount of frequency with which the base station is serving an individual UE is greater than a frequency threshold and (ii) a processor load of the base station is greater than a threshold load;

responsive to the determining that the amount of frequency with which the base station is serving the individual UE is greater than the frequency threshold and the processor load of the base station is greater than the threshold load, causing the base station to allocate an extent of resources to the individual UE without engaging in FSS with the individual UE;

determining that another amount of frequency with which the base station is serving another UE is less than the frequency threshold; and responsive to the determining that the other amount of frequency with which the base station is serving the other UE is less than the frequency threshold, causing the base station to allocate an extent of resources to the other UE by engaging in FSS with the other UE.

15. The method of claim 14, wherein the amount of frequency comprises a size of a frequency channel.

16. The method of claim 14, wherein the amount of frequency comprises a number of frequency bands.

17. The method of claim 14, wherein engaging in FSS while serving the plurality of UEs comprises allocating resources to the plurality of UEs based on sub-band channel quality indicator (CQI) values reported respectively by the plurality of UEs.

* * * * *